United States Patent
Li et al.

(10) Patent No.: US 10,461,543 B2
(45) Date of Patent: Oct. 29, 2019

(54) WIRELESSLY RECHARGEABLE BATTERY AND COMPONENTS THEREOF

(71) Applicant: Apple Inc., Cupertino, CA (US)

(72) Inventors: Hao Li, Freemans Bay (NZ); Saining Ren, Freemans Bay (NZ); Aijun Qin, Freemans Bay (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/107,993

(22) Filed: Aug. 21, 2018

(65) Prior Publication Data

US 2018/0358815 A1   Dec. 13, 2018

Related U.S. Application Data

(63) Continuation of application No. 15/671,599, filed on Aug. 8, 2017, which is a continuation of application (Continued)

(30) Foreign Application Priority Data

Sep. 29, 2011 (NZ) ........................................ 595403

(51) Int. Cl.
| | |
|---|---|
| *H02J 7/00* | (2006.01) |
| *H02J 5/00* | (2016.01) |
| *H02J 7/02* | (2016.01) |
| *H02J 50/00* | (2016.01) |
| *H02J 50/70* | (2016.01) |
| *H01F 38/14* | (2006.01) |

(Continued)

(52) U.S. Cl.
CPC .............. *H02J 5/005* (2013.01); *H01F 38/14* (2013.01); *H01M 2/1055* (2013.01); *H01M 10/46* (2013.01); *H02J 7/02* (2013.01); *H02J 7/025* (2013.01); *H02J 50/00* (2016.02); *H02J 50/70* (2016.02); *H01F 2003/005* (2013.01)

(58) Field of Classification Search
CPC .... H02J 7/02; H02J 7/025; H02J 5/005; H02J 50/00
USPC ........................................................ 320/108
See application file for complete search history.

(56) References Cited

U.S. PATENT DOCUMENTS

| | | |
|---|---|---|
| 3,800,213 A | 3/1974 | Rorden |
| 4,825,166 A | 4/1989 | MacGugan |
| | (Continued) | |

FOREIGN PATENT DOCUMENTS

| | | |
|---|---|---|
| JP | 2000231910 A | 8/2000 |
| JP | 2005117748 A | 4/2005 |
| | (Continued) | |

OTHER PUBLICATIONS

International Search Report for International Application No. PCT/NZ2012/000172 dated Jan. 17, 2013 (18 pages).

(Continued)

*Primary Examiner* — Suchin Parihar

(57) ABSTRACT

A receiver coil assembly for a wirelessly rechargeable battery including first and second transverse coils and a third coil encompassing the first and second coils. The receiver coil may be employed in a power receiver of a wirelessly rechargeable battery. Also disclosed is a wirelessly rechargeable battery having a power receiver demountable from an electrochemical cell.

13 Claims, 3 Drawing Sheets

Related U.S. Application Data

No. 14/347,096, filed as application No. PCT/NZ2012/000172 on Sep. 24, 2012, now Pat. No. 9,735,586.

(60) Provisional application No. 61/640,739, filed on May 1, 2012.

(51) Int. Cl.
*H01M 10/46* (2006.01)
*H01M 2/10* (2006.01)
*H01F 3/00* (2006.01)

(56) References Cited

U.S. PATENT DOCUMENTS

| | | | |
|---|---|---|---|
| 5,281,941 A | 1/1994 | Bernstein | |
| 6,208,115 B1* | 3/2001 | Binder | H02J 7/022 307/66 |
| 6,316,915 B1* | 11/2001 | Fujiwara | H02J 7/0031 320/134 |
| 6,661,197 B2* | 12/2003 | Zink | H01M 10/46 320/108 |
| 6,791,447 B2 | 9/2004 | Scheible et al. | |
| 6,873,242 B2 | 3/2005 | Ahrens et al. | |
| 7,042,196 B2* | 5/2006 | Ka-Lai | H01F 38/14 320/108 |
| 7,248,017 B2 | 7/2007 | Cheng et al. | |
| 7,414,380 B2 | 8/2008 | Tang et al. | |
| 7,511,454 B1 | 3/2009 | Legg | |
| 7,525,283 B2* | 4/2009 | Cheng | H01F 3/02 320/108 |
| 7,948,208 B2 | 5/2011 | Partovi et al. | |
| 8,010,205 B2* | 8/2011 | Rahman | A61N 1/3787 607/60 |
| 8,310,201 B1* | 11/2012 | Wright | G08C 17/02 320/108 |
| 8,587,154 B2* | 11/2013 | Fells | H01F 38/14 307/104 |
| 8,853,891 B2* | 10/2014 | Soar | F41H 1/02 307/104 |
| 8,896,315 B1* | 11/2014 | Davies | H02J 7/0016 324/434 |
| 9,318,780 B2 | 4/2016 | Robertson et al. | |
| 9,344,155 B2 | 5/2016 | Moes et al. | |
| 9,452,296 B2* | 9/2016 | Forsell | A61N 1/3787 |
| 9,647,483 B1* | 5/2017 | Bana | H02J 7/025 |
| 9,735,586 B2* | 8/2017 | Li | H01F 38/14 |
| 2002/0080083 A1* | 6/2002 | Nantz | H01Q 1/3241 343/788 |
| 2003/0027036 A1* | 2/2003 | Emori | H01M 2/34 429/61 |
| 2005/0189882 A1 | 9/2005 | Baarman et al. | |
| 2005/0275983 A1* | 12/2005 | Franklin | H01M 8/04559 361/56 |
| 2006/0061325 A1* | 3/2006 | Tang | H01F 38/14 320/108 |
| 2007/0150009 A1 | 6/2007 | Kveen et al. | |
| 2007/0273327 A1 | 11/2007 | Daniel et al. | |
| 2008/0172109 A1 | 7/2008 | Rahman et al. | |
| 2008/0238364 A1 | 10/2008 | Weber et al. | |
| 2008/0298100 A1 | 12/2008 | Esaka et al. | |
| 2009/0010462 A1 | 1/2009 | Ekchian et al. | |
| 2009/0051324 A1* | 2/2009 | Nakatsuji | H01M 10/441 320/134 |
| 2009/0278505 A1 | 11/2009 | Toya et al. | |
| 2010/0123430 A1 | 5/2010 | Kojima et al. | |
| 2010/0141214 A1* | 6/2010 | Yoon | B60K 6/28 320/134 |
| 2010/0181962 A1 | 7/2010 | Chen et al. | |
| 2010/0194206 A1 | 8/2010 | Burdo et al. | |
| 2010/0259401 A1* | 10/2010 | Azancot | H01F 38/14 340/657 |
| 2011/0031928 A1 | 2/2011 | Soar | |
| 2011/0084652 A1 | 4/2011 | Julstrom et al. | |
| 2011/0084653 A1 | 4/2011 | Julstrom et al. | |
| 2011/0084654 A1 | 4/2011 | Julstrom et al. | |
| 2011/0086256 A1* | 4/2011 | Julstrom | H01F 38/14 429/121 |
| 2011/0121660 A1 | 5/2011 | Azancot et al. | |
| 2011/0127954 A1 | 6/2011 | Walley et al. | |
| 2011/0210697 A1 | 9/2011 | Yin et al. | |
| 2011/0228436 A1* | 9/2011 | Lee | 361/93.7 |
| 2011/0241607 A1 | 10/2011 | Wiegers | |
| 2011/0298418 A1 | 12/2011 | Yeh | |
| 2012/0001644 A1* | 1/2012 | Baarman | G01D 5/2066 324/629 |
| 2012/0148878 A1 | 6/2012 | Normura | |
| 2012/0153740 A1* | 6/2012 | Soar | F41H 1/02 307/104 |
| 2012/0187851 A1* | 7/2012 | Huggins | H02J 7/025 315/159 |
| 2012/0274154 A1 | 11/2012 | Deluca | |
| 2013/0005251 A1 | 1/2013 | Soar | |
| 2013/0069587 A1 | 3/2013 | Kuk | |
| 2013/0175982 A1* | 7/2013 | Teggatz | H01M 10/4257 320/108 |
| 2014/0002012 A1* | 1/2014 | McCauley | H02J 7/025 320/108 |
| 2014/0091756 A1* | 4/2014 | Ofstein | H02J 5/005 320/108 |
| 2014/0232330 A1* | 8/2014 | Robertson | H01M 2/1022 320/108 |
| 2014/0239888 A1 | 8/2014 | Chen | |
| 2014/0252869 A1* | 9/2014 | Kamiura | H02J 7/025 307/104 |
| 2014/0349573 A1 | 11/2014 | Moes et al. | |
| 2015/0222129 A1 | 8/2015 | McCauley et al. | |
| 2015/0365003 A1* | 12/2015 | Sadwick | H02M 3/28 363/21.01 |
| 2017/0338684 A1 | 11/2017 | Mishriki et al. | |

FOREIGN PATENT DOCUMENTS

| | | |
|---|---|---|
| JP | 2009267767 A | 11/2009 |
| WO | 0167046 A1 | 9/2001 |
| WO | 2008156025 A1 | 12/2008 |
| WO | 2010036980 A1 | 4/2010 |
| WO | 2011024621 A1 | 3/2011 |

OTHER PUBLICATIONS

International Preliminary Report on Patentability for International Application No. PCT/NZ2012/000172 dated Apr. 1, 2014 (7 pages).
Chinese Office Action for CN Application No. 2012800471757 dated Dec. 2, 2015 (5 pages).
Japanese Office Action for JP Application No. 2014-533236 dated Apr. 26, 2016 (6 pages).
Second Chinese Office Action for CN Application No. 2012800471 dated Jul. 25, 2016 (5 pages). English Translation attached.
European Report for EP Patent Application No. 12837228.1 dated Oct. 12, 2017 (6 pages).
QiStone "The First Completely Wireless Power Bank" [Viewed on Internet on Jan. 19, 2016] <URL:https://www.youtube.com/watch?v=8SIOU2W0MR0>, Published Aug. 5, 2014.

\* cited by examiner

WIRELESSLY RECHARGEABLE BATTERY AND COMPONENTS THEREOF

This application is a Continuation of U.S. application Ser. No. 15/671,599, filed 8 Aug. 2017, which is a Continuation of U.S. application Ser. No. 14/347,096, filed 25 Mar. 2014, which is a National Stage Application of PCT/NZ2012/000172, filed 24 Sep. 2012, which claims benefit of Serial No. 595403, filed 29 Sep. 2011 in New Zealand and Ser. No. 61/640,739, filed 1 May 2012 in the United States and which applications are incorporated herein by reference. To the extent appropriate, a claim of priority is made to each of the above disclosed applications.

FIELD OF THE INVENTION

This invention relates to wirelessly rechargeable batteries. More particularly, although not exclusively, the invention relates to receiver coil topologies, battery shielding and demountable power receivers.

BACKGROUND OF THE INVENTION

Wirelessly rechargeable batteries have been used in a range of devices, such as electric toothbrushes, for many years. Such devices typically employ non-standard batteries or are not easily replaceable. Common consumer batteries still typically require galvanic connections to effect recharging. There is a demand for consumer rechargeable batteries that may conveniently be charged wirelessly if placed in a charging region without requiring any special orientation or galvanic connection.

The power receiver needs to be as small as possible to ensure an adequate battery capacity for typical consumer applications. It also needs to be able to couple with a charging alternating magnetic field in any orientation—as the battery may be placed in a charging region in any orientation or may be within a device in any orientation.

The battery also needs to be able to be charged rapidly without overheating of the electrochemical cell in the charging magnetic field.

Further, it would be desirable for the power receiver of the battery to be recyclable or reusable by consumers.

A number or receiver coil topologies have been proposed and are discussed below.

WO 2001/67046 discloses a wireless power receiver with three mutually orthogonal windings wound on a cross shaped core (i.e. the core is the shape of the origin of XYZ coordinate system).

U.S. Pat. No. 5,281,941 discloses a spherical form for supporting three mutually orthogonal windings.

U.S. Pat. No. 7,414,380 discloses a wireless power receiver with three mutually orthogonal coils wound on a parallelepiped shaped core.

U.S. Pat. No. 7,248,017 discloses a wirelessly rechargeable battery with a winding wound on a core outside the battery, or wound on a core and housed inside the battery. The axis of the winding is parallel to the longitudinal axis of the battery. The specification also discloses having two orthogonal windings to give the battery rotational freedom when charging.

US 2011/0086256 discloses a wirelessly rechargeable battery with the receiver circuitry placed in one end of the battery, but the winding is on the outside of the battery.

The above topologies are all somewhat bulky and/or have poor coupling in some orientations. Further, the above designs are integrally formed and do not allow easy reuse. Further, they do not provide shielding of the electrochemical cell.

It is an object of the invention to provide a coil receiver assembly, power receiver and wirelessly rechargeable battery that overcome at least some of these problems or to at least provide the public with a useful choice.

SUMMARY OF THE INVENTION

According to one exemplary embodiment there is provided a receiver coil assembly for a rechargeable battery including first and second coils having magnetic axes oriented transverse to one another; and a third coil having a magnetic axis transverse to the magnetic axes of the first and second coils and encompassing the first and second coils.

The third coil is preferably a substantially annular coil and the assembly preferably has a generally cylindrical form.

The first and second coils are preferably arranged in a cross with the first and second coils wound about arms of the cross and the third coil wound about the cross.

According to another exemplary embodiment there is provided receiver coil assembly for a rechargeable battery including first, second and third coils having magnetic axes oriented transverse to one another, wherein one of the coils enables greater power transfer than the other coils.

The third coil preferably encompasses the other coils and the first and second coils are preferably in a cross arrangement.

The power transfer capacity of the third coil is preferably at least 10%, more preferably 20%, more than that of the first and second coils. The length of the conductor of the third coil is preferably at least 25%, more preferably 50%, more than that of the first and second coils.

According to another exemplary embodiment there is provided wirelessly rechargeable battery having a power receiver and an electrochemical cell wherein the power receiver is housed within a first battery sub-casing and the electrochemical cell is housed within a second battery sub-casing wherein the first and second sub-casings are demountable.

The power receiver may be user-demountable from the electrochemical cell by virtue of a screw, push-fit or magnetic connection.

The electrochemical cell may be magnetically shielded by a metal layer about the electrochemical cell. This layer may be about one skin depth and may be formed of copper foil.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of exemplary embodiments given below, serve to explain the principles of the invention.

DETAILED DESCRIPTION OF EMBODIMENTS OF THE INVENTION

Figure 1:
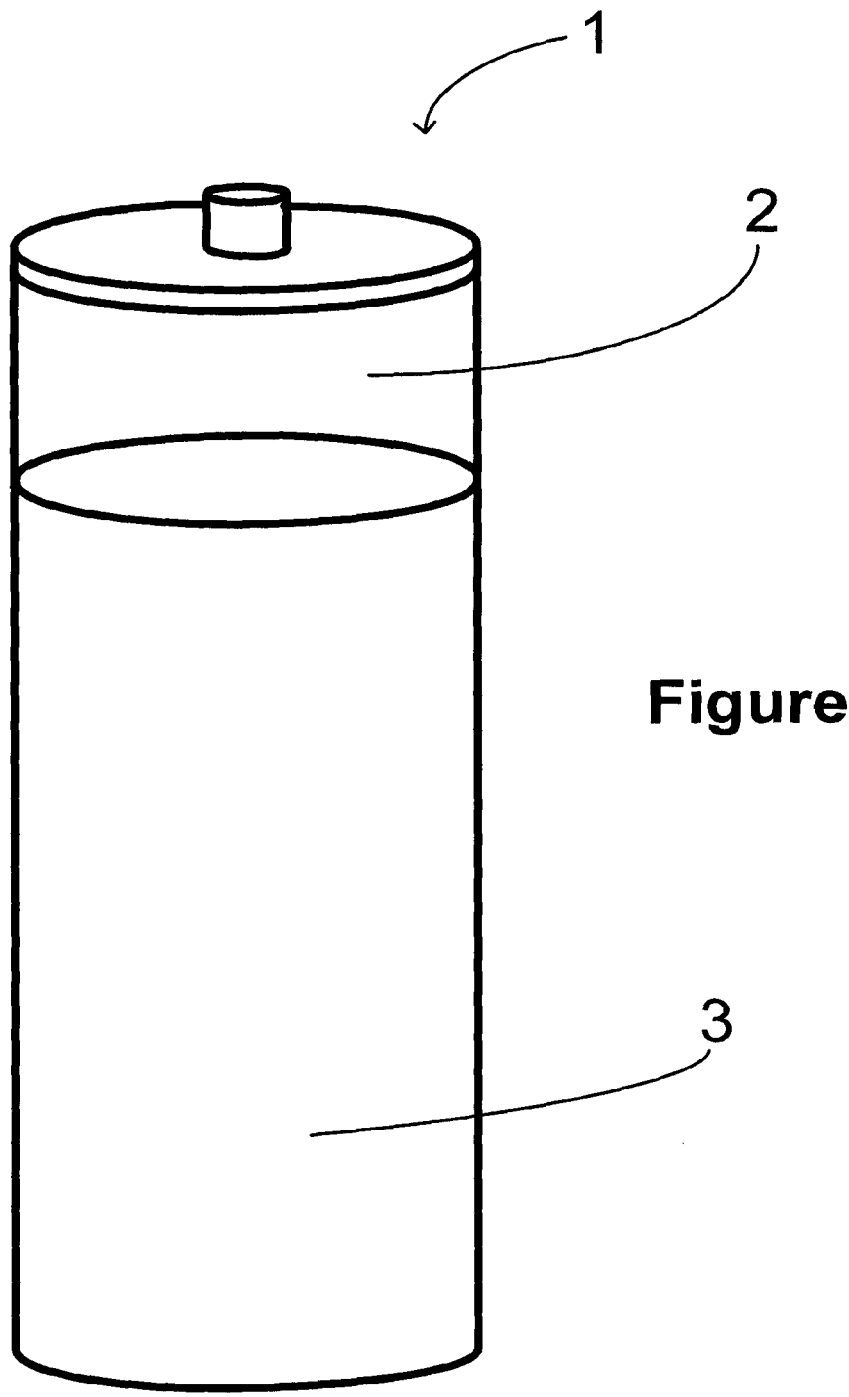
FIG. 1 shows a wirelessly rechargeable battery.

FIG. 1 shows a wirelessly rechargeable battery of two part construction. A power receiver is housed within a first battery sub-casing 2 and is demountable from a second battery sub-casing 3 which houses a rechargeable electrochemical cell. The first battery sub-casing 2 and second battery sub-casing 3 may be interconnected by way of screw threads, a push-fit connection, magnetic coupling or the like to enable a user to detach the sub-casing 2 from sub-casing 3 and connect the removed sub-casing 2 to a new sub-casing containing a new electrochemical cell.

The electrochemical cell may be magnetically shielded to avoid overheating when the battery is located in a charging alternating magnetic field. This may be achieved by providing metal shielding about the electrochemical cell. This may take the form of a metal foil applied about the exterior of sub-casing 3. The metal foil may be of about one skin depth with copper being a desirable metal due its desirable shielding properties.

Figure 2:
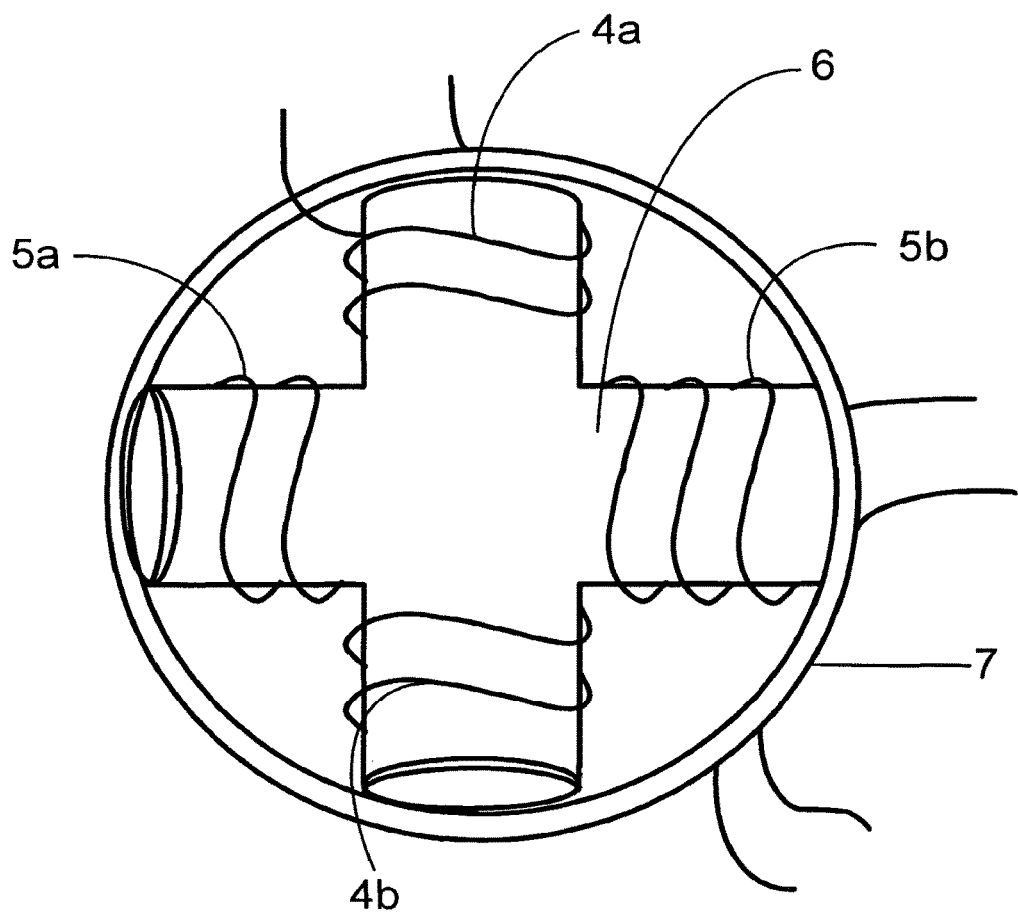
FIG. 2 shows the power receiver coil assembly of the battery shown in FIG. 1.

Referring now to FIG. 2 a receiver coil assembly according to one embodiment is shown. A first winding 4a and 4b is wound about arms of cross-shaped ferrite core 6 and a second winding 5a and 5b is wound about the other arms of cross-shaped ferrite core 6. A third winding 7 is wound about the perimeter of cross-shaped ferrite core 6. Ideally the coils are orthogonal to one another to ensure coupling with a charging magnetic field in any orientation. However, in some applications the coils may not be orthogonal due to space constraints or preferential coupling orientations for particular applications.

The third coil is preferably annular so as to best conform to a cylindrical battery casing. The third coil may be designed have greater power transfer capacity than the other coils. This may be desirable where the battery has a normal or preferred orientation so that the third coil typically supplies power at the fastest rate whereas the first and second coils still allow power transfer in other orientations. The power transfer capacity of the third coil may be at least 10%, preferably 20% more than that of the first and second coils. To achieve this, the length of the conductor of the third coil may be at least 25%, preferably 50% greater than the length of the first and second coil conductors.

In an exemplary embodiment the mean diameter of the outer coil is 12 mm and has 50 turns whereas the mean diameter of the first and second windings is about 4 mm and each has 80 turns. The windings may all be 0.05 mm gauge insulated copper wire.

Figure 3:
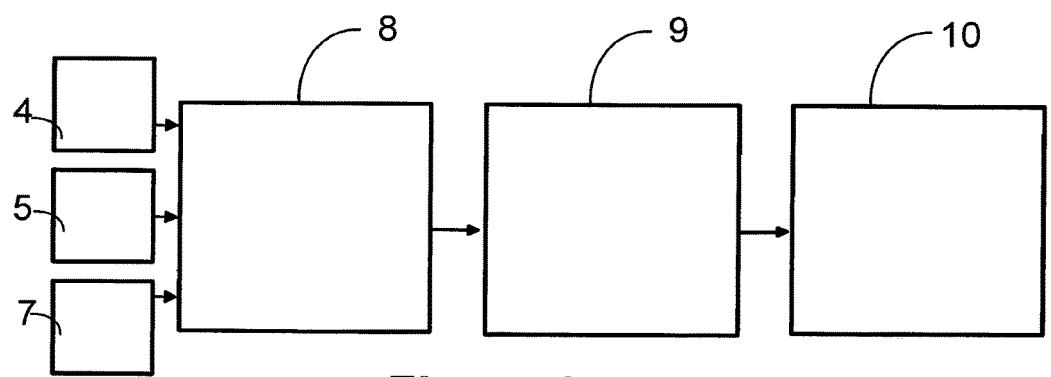
FIG. 3 shows a schematic diagram of the power receiver of the battery shown in FIG. 1.

FIG. 3 shows a schematic diagram of the components of the battery. Current induced in coils 4 (4a and 4b), 5 (5a and 5b) and 7 is supplied to receiver circuit 8 which may rectify and condition alternating current received from the coils. Battery charging management circuit 9 controls the supply of power to rechargeable electrochemical cell 10 according to charging parameters for the type of battery chemistry employed. The power receiver is made up of coils 4, 5 and 7 and receiver circuit 8 and battery charging management circuit 9 and is contained in sub-casing 2. The rechargeable electrochemical cell 10 is housed within sub-casing 3.

The wirelessly rechargeable battery described offers a compact design offering enhanced coupling in a preferred orientation whilst ensuring adequate coupling in all directions. The demountable two part battery construction allows easy reuse of the power receiver avoiding waste and adverse environmental impact. Shielding the electrochemical cell avoids overheating and allows rapid charging.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the applicant's general inventive concept.

The invention claimed is:

1. A device for charging a battery, the device comprising:
first and second receiver coils having magnetic axes oriented transverse to one another;
a third receiver coil having a magnetic axis transverse to the magnetic axes of the first and second receiver coils; and
a cylindrical outer casing having a base and a side wall, wherein the third receiver coil is adapted to couple to a transmitter coil when the side wall is oriented perpendicular to a magnetic axis of the transmitter coil.

2. The device of claim 1 wherein the third receiver coil is a substantially annular coil.

3. The device of claim 1 wherein the first and second receiver coils are arranged in a cross.

4. The device of claim 1 including ferrite core material located within the first, second, and third receiver coils.

5. The device of claim 4 wherein the ferrite core material is arranged in the form of a cross with the first and second receiver coils wound about arms of the cross and the third receiver coil wound about distal ends of the arms of the cross.

6. The device of claim 1, wherein one of the first, second, and third receiver coils enables greater power transfer than each of the others of the first, second, and third receiver coils.

7. The device of claim 6 wherein the power transfer capacity of one of the first, second, and third receiver coils is at least 10% more than that of each of the others of the first, second, and third receiver coils.

8. The device of claim 7 wherein the power transfer capacitor of one of the first, second, and third receiver coils is at least 20% more than that of each of the others of the first, second, and third receiver coils.

9. The device of claim 6 wherein a length of a conductor of one of the first, second, and third receiver coils is at least 25% greater than a length of a conductor of each of the others of the first, second, and third receiver coils.

10. The device of claim 9 wherein the length of the conductor of one of the first, second, and third receiver coils is at least 50% greater than the length of the conductor of each of the others of the first, second, and third receiver coils.

11. The device of claim 1, further comprising an electrochemical cell electrically coupled with one of the first, second, and third receiver coils.

12. The device of claim 11 wherein the electrochemical cell is magnetically shielded by a metal layer.

13. The device of claim 12 wherein the metal layer is of about one skin depth.

* * * * *